Aug. 7, 1962  S. C. SIMPSON  3,048,229
CULTIVATOR
Filed May 9, 1960  2 Sheets-Sheet 1

INVENTOR
S. C. SIMPSON

BY
ATTORNEY

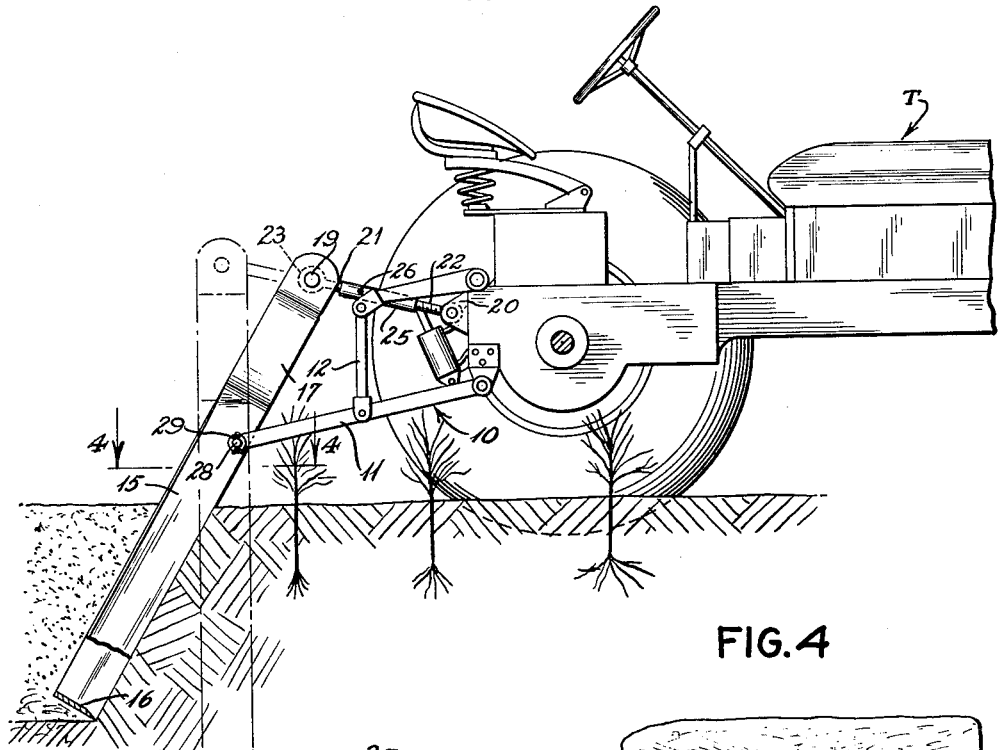
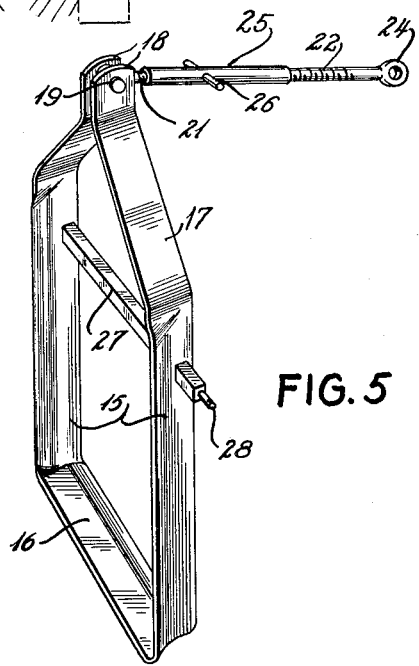
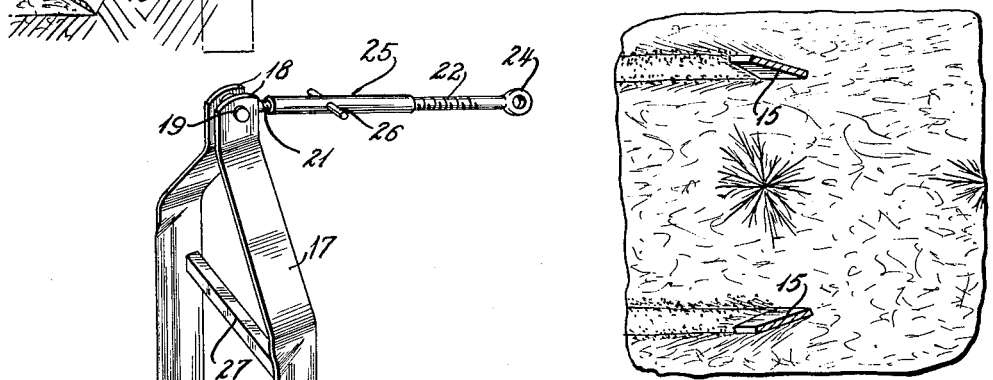
INVENTOR
S. C. SIMPSON

United States Patent Office 3,048,229
Patented Aug. 7, 1962

3,048,229
CULTIVATOR
Stuart C. Simpson, P.O. Box 178, Monticello, Fla.
Filed May 9, 1960, Ser. No. 27,693
1 Claim. (Cl. 172—698)

This invention relates to agricultural implements and equipment employed on the farm and elsewhere for the cultivation of the soil in order to promote the growth of row crops and plants and to increase the yield thereof.

The invention relates particularly to agricultural implements or equipment applicable to a conventional tractor or other propelling vehicle by attachment to portions, certain of which are movable and the movement of which is controlled, such as the lift arms by which the equipment can be raised and lowered during the performance of the work.

Heretofore plows and cultivators of various kinds have been utilized along and between rows of plants to loosen the earth and provide a furrow by the deflection of the earth but without affecting the earth directly beneath the plants so necessary to facilitate the development of their root systems to promote maximum growth.

It is an object of the invention to provide a cultivator attachment which can be readily applied to a propelling vehicle, such as a conventional tractor, and utilized to loosen the soil beneath as well as at the sides of the growing plants to cultivate the soil and remove any undesirable vegetation or growth from the furrows, and which device may be adjusted to regulate the depth of cultivation during the movement of the tractor.

Another object of the invention is to provide a simple and inexpensive type of plow or cultivator which can be readily attached to the lift arms of a conventional tractor and utilized to loosen the earth beneath as well as at each side of a plant or row of plants to provide room for and to stimulate the root systems of the plants.

A further object of the invention is to provide a cultivator or plow for loosening the earth beneath and at each side of a plant or row of plants and constructed to be adjustably mounted to control the depth and angularity of the plow.

Figure 1:
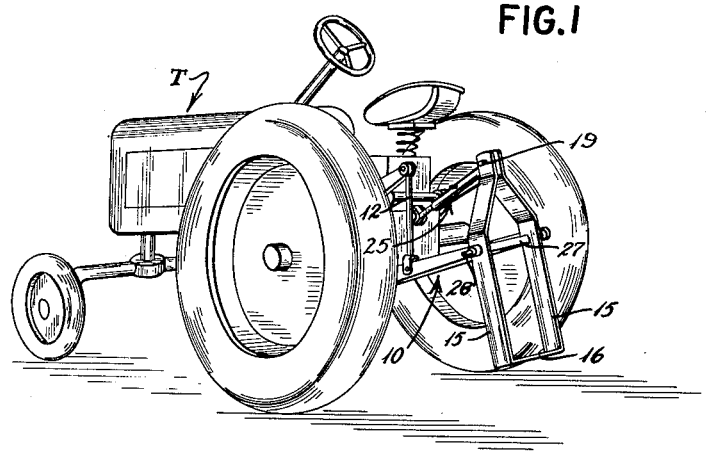
Figure 2:
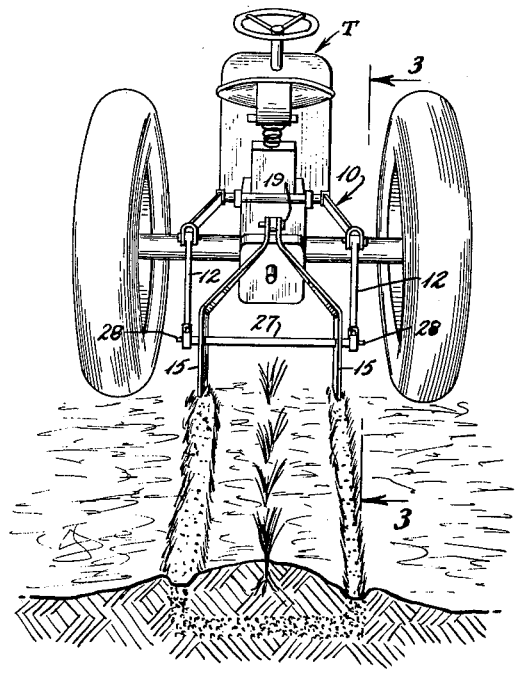

These and other objects and advantages of the invention will be apparent from the following description taken in conjunction with the accompanying drawings wherein:

FIG. 1 is a perspective of a device in accordance with the present invention mounted on a conventional tractor hitch;

FIG. 2, a rear elevation of the device of FIG. 1 illustrating the manner of use;

FIG. 3, an enlarged fragmentary side elevation illustrating the angular adjustment of the device;

FIG. 4, a perspective on the line 4—4 of FIG. 3; and

FIG. 5, a detailed perspective of a cultivator in accordance with the present invention.

Briefly stated, the cultivator of the present invention includes a body of generally hollow rectangular configuration having sides spaced apart substantially the width of a row and with the lower ends of said sides connected by a cross member. The side members have portions angularly disposed or converging in the direction of forward movement in order to loosen the dirt along the row of plants and to deflect the dirt into the furrow to eliminate undesirable growth. The side members are pivotally mounted intermediate their ends on the hydraulic lift of a tractor and substantially transversely of the line of travel of the latter and are adjustably connected at their upper ends to the tractor to vary the depth of penetration of the cross member and the amount of earth cultivated.

With continued reference to the drawings, a tractor T with a conventional lift hitch 10 of the hydraulic type at its rear end is provided. The lift hitch includes spaced side bars 11 pivotally connected to arms 12 by means of which they may be raised and lowered by hydraulic or other suitable means.

The cultivator or plow of the present invention has a body of generally hollow rectangular configuration with a pair of generally flat side members 15 spaced apart a distance approximating the width of a row of the crop to be cultivated and connected at their lower ends by a cross member 16. The side members 15 are substantially vertical when in use and have their forward edges convergingly inclined as illustrated in FIGS. 2 and 4, to cultivate the earth at each side of a row of plants. The upper portions of the side members 15 have converging portions 17 which terminate in upwardly extending, spaced generally parallel end portions 18.

In order to mount the plow on a tractor the parallel upper end portions 18 are provided with a bolt and nut 19 which is adjustably connected to a bracket 20 fixed to the tractor by means of a turnbuckle connection which includes oppositely externally threaded end members 21 and 22 having eyes 23 and 24 adapted to be fastened to the pins 19 and bracket 20 and with an oppositely internally threaded sleeve 25 receiving the ends of said externally threaded members and with manipulating portions 26. Upon rotation of the sleeve the length of such coupling member will be reduced or increased. In addition to the connection at the top, a transverse bar 27 is provided across and through the upper portion of the sides 15 and with the ends of such bar provided with reduced portions 28 of a size to be received in the outer ends of the lift arms 11 of the tractor to be held therein by cotter pin 29.

In operation the reduced bearing extremity 28 on each of the bars 27 is mounted in one of the lift arms 11 and the eye 23 of the turnbuckle connection member 21 is placed between the spaced upper ends of the plow and the pin 19 inserted. The eye 24 is attached to the bracket 20 by any conventional means such as a pin, not shown, to secure the turnbuckle to the tractor. The sleeve 25 of the turnbuckle is then rotated to adjust the angularity of the plow and to control the depth and amount of cultivation beneath the row of plants. It will be understood that the greater the amount of angularity from the vertical the greater will be the amount of earth loosened by the cross member 16. As the tractor moves along the row of plants the cultivator will pass on both sides and underneath the row of plants to make room for and to stimulate the root system and consequently increase the amount of and quality of yield. Simultaneously with the loosening of the soil the surface dirt will be turned over by the angular disposition of the lower side portions of the plow and remove any undesirable growth in the furrow between the rows of plants.

It will be apparent that the plow may be adjusted for greater angularity and therefore provide a greater amount of cultivation on relatively young plants which require the most stimulation of the root systems. As the plants increase in size the plow is adjusted to cultivate at a greater depth at which time the need for cultivation beneath the root systems will not be as great as when the plants were young.

It will be obvious to those skilled in the art that various changes may be made in the embodiments of the invention described without departing from the spirit and scope thereof and that the invention is not limited to what is shown in the drawing and described in the specification but only as set forth in the following claims.

What is claimed is:

A cultivator for attachment to a tractor having a 3-point hitch including a pair of lift arms, said cultivator comprising;
- a one-piece, hollow, polygonal frame of relatively thin metal strip including a pair of parallel facing side portions laterally spaced in vertically disposed relation, the forward edges of said side portions being inclined toward each other for simultaneously loosening and deflecting the soil, a straight, flat, narrow cutter bar connecting the lower ends of said side portions and being sharpened at its forward edge, the upper ends of said side portions converging inwardly and terminating in a pair of parallel ears;
- a transverse bar extending across and through said spaced, parallel side portions and provided at each end with pivot portions for direct attachment to the lift arms of the tractor;
- a quick adjustable coupling link having one end secured to said vertical ears and with its other end fitted for attachment to the tractor, means embodied in said link for adjusting its length to thereby rotate the cultivator frame about said pivot portions to various fixed angular positions whereby the inclination of the flat cutter bar with respect to the ground is varied to thereby regulate both the depth of cut and the amount of cultivation beneath a row of plants.

References Cited in the file of this patent
UNITED STATES PATENTS

| | | |
|---|---|---|
| 2,341,807 | Olmstead et al. | Feb. 15, 1944 |
| 2,688,910 | Adair | Sept. 14, 1954 |
| 2,703,044 | Adair | Mar. 1, 1955 |
| 2,869,654 | Hershman | Jan. 20, 1959 |
| 3,002,574 | Padrick | Oct. 3, 1961 |